United States Patent
Park et al.

(10) Patent No.: US 12,069,130 B2
(45) Date of Patent: Aug. 20, 2024

(54) MEDIA CLOCK RECOVERY DEVICE AND A METHOD FOR RECOVERING MEDIA CLOCK, AND AN ELECTRONIC DEVICE

(71) Applicant: Samsung Electronics Co., Ltd., Suwon-si (KR)

(72) Inventors: Jong Ho Park, Suwon-si (KR); Chang Sub Lee, Hwaseong-si (KR); Ji-Heon Oh, Gwacheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/056,545

(22) Filed: Nov. 17, 2022

(65) Prior Publication Data

US 2023/0262119 A1 Aug. 17, 2023

(30) Foreign Application Priority Data

Feb. 14, 2022 (KR) ........................ 10-2022-0018685

(51) Int. Cl.
*G06F 15/16* (2006.01)
*H04L 67/1095* (2022.01)
*H04L 67/1097* (2022.01)

(52) U.S. Cl.
CPC ...... *H04L 67/1095* (2013.01); *H04L 67/1097* (2013.01)

(58) Field of Classification Search
CPC .................. H04L 67/1095; H04L 67/1097
USPC ........................ 709/223, 224, 248
See application file for complete search history.

(56) References Cited

U.S. PATENT DOCUMENTS

| | | | |
|---|---|---|---|
| 8,699,646 B2 | 4/2014 | Olsen et al. | |
| 8,750,282 B2 | 6/2014 | Gelter et al. | |
| 8,832,338 B2 | 9/2014 | Yi et al. | |
| 10,623,123 B2 | 4/2020 | Stein et al. | |
| 11,025,406 B2 | 6/2021 | Jean et al. | |
| 11,295,773 B1* | 4/2022 | Yamamoto | G11B 5/00813 |
| 2011/0228888 A1* | 9/2011 | Gelter | H04N 21/23406 375/371 |
| 2018/0212856 A1* | 7/2018 | Shigehisa | H04N 21/4305 |
| 2019/0245676 A1* | 8/2019 | Bai | G06F 1/12 |

(Continued)

FOREIGN PATENT DOCUMENTS

| | | |
|---|---|---|
| KR | 10-2004-0013615 A | 2/2004 |
| KR | 10-2008-0072169 A | 8/2008 |

*Primary Examiner* — Liang Che A Wang
(74) *Attorney, Agent, or Firm* — Harness, Dickey & Pierce, P.L.C.

(57) ABSTRACT

A media clock recovery device, a method for recovering media clock, and an electronic device are provided. The media clock recovery device comprising processing circuitry configured to determine whether a time stamp is normal, the time stamp being received in a packet through a network, calculate an average time interval of a dummy time stamp, the calculated average time interval of the dummy time stamp being used for generating a media clock in response to determining the time stamp is not normal, generate the dummy time stamp based on the calculated average time interval of the dummy time stamp, wherein the processing circuitry is configured to determine the time stamp is not normal, in response to the packet not being received within a time threshold value from a reception time of a previously received packet.

20 Claims, 10 Drawing Sheets

(56) References Cited

U.S. PATENT DOCUMENTS

2019/0393964 A1* 12/2019 Tehrani .............. H04B 10/6165
2023/0069803 A1* 3/2023 Paikaray ............... H04J 3/0664

* cited by examiner

1

100

MEDIA CLOCK RECOVERY DEVICE AND A METHOD FOR RECOVERING MEDIA CLOCK, AND AN ELECTRONIC DEVICE

CROSS-REFERENCE TO RELATED APPLICATION

This application claims priority from Korean Patent Application No. 10-2022-0018685, filed on Feb. 14, 2022, in the Korean Intellectual Property Office, the disclosure of which is incorporated herein by reference in their entirety.

BACKGROUND

1. Technical Field

The present disclosure relates to a media clock recovery device, a method for recovering the media clock, and an electronic device including the media clock recovery device. Specifically, the present disclosure relates to a media clock recovery device that adopts an Ethernet network, a method for recovering the media clock, and an electronic device including the medial clock recovery device.

2. Description of the Related Art

In a media system, a talker (such as a transmitter) may convert analog audio and video signal into digital signal. The talker may transmit the converted signal to a listener (such as a receiver). The listener may receive the transmitted signal, convert the transmitted signal back into an analog signal, and provide the analog signal to a user.

At this time, in order to send more digital data to a given channel capacity, the digital audio and video data are each compressed by a compression algorithm and sent in the form of a bit stream, and the listener may decompress the compressed digital data to recover an original digital audio and video data.

On the other hand, in the media system, the talker transmits the media clock to the listener in the form of a time stamp, and the listener may recover the media clock by the use of the received time stamp. At this time, the media clock between the talker and the listener needs to be toggled at the exact time point based on the value of the exact time stamp. For example, the media clock may mean an STC (System Time Clock) of the video data, and the STC of the talker and the listener may be required to have the same value with each other.

On the other hand, when the network connection between the talker and the listener is disconnected and the supply of the time stamp from the talker to the media clock is interrupted, the listener may not be able to recover the media clock. When the media clock cannot be recovered, there may be a problem that the user may not be able to obtain the output, which may cause problems of the entire media system.

SUMMARY

Example embodiments of the present disclosure provide a media clock recovery device capable of generating a media clock even in a situation in which a packet cannot be temporarily provided due to a situation such as a network problem.

Example embodiments of the present disclosure also provide a method for generating a media clock capable of generating a media clock even in a situation in which a packet cannot be temporarily provided due to a situation such as a network problem.

Example embodiments of the present disclosure also provide an electronic device including the media clock recovery device capable of generating a media clock even in a situation in which a packet cannot be temporarily provided due to a situation such as a network problem.

According to some example embodiments of the present disclosure, there is a provided media clock recovery device comprising processing circuitry configured to determine whether a time stamp is normal, the time stamp being received in a packet through a network, calculate an average time interval of a dummy time stamp, the calculated average time interval of the dummy time stamp being used for generating a media clock in response to determining the time stamp is not normal, and generate the dummy time stamp based on the calculated average time interval of the dummy time stamp, wherein the processing circuitry is configured to determine the time stamp is not normal, in response to the packet not being received within a time threshold value from a reception time of a previously received packet.

According to some example embodiments of the present disclosure, there is a provided method for recovering a media clock, the method comprising determining whether a time stamp received is normal, the time stamp being received in a packet through a network, calculating an average time interval of a dummy time stamp, the calculated average time interval of the dummy time stamp being used for generating a media clock in response to determining the time stamp is not normal, and generating the dummy time stamp based on the calculated average time interval of the dummy time stamp, wherein the determining whether the time stamp is normal is based on whether the packet is received within a time threshold value from a reception time of a previously received packet.

According to some example embodiments of the present disclosure, there is a provided electronic device comprising a receiver configured to receive a packet including a time stamp and data from outside through a network, and generate a media clock using the time stamp, a processing unit configured to receive the media clock to process the data. And a transmitter configured to transmit the processed data to outside the electronic device, wherein the receiver is configured to determine whether the time stamp is normal, based on whether the packet is received within a time threshold value or more from a reception time of a previously received packet, the receiver is configured to calculate an average time interval of a dummy time stamp for generating the media clock in response to determining the time stamp is not normal, and the receiver is configured to generate the dummy time stamp based on the average time interval of the dummy time stamp.

However, example embodiments of the present disclosure are not restricted to the one set forth herein. The above and other aspects of the present disclosure will become more apparent to one of ordinary skill in the art to which the present disclosure pertains by referencing the detailed description of the present disclosure given below.

DETAILED DESCRIPTION OF THE EXAMPLE EMBODIMENTS

Hereinafter, example embodiments according to the technical idea of the present disclosure will be described referring to the accompanying drawings.

Figure 1:
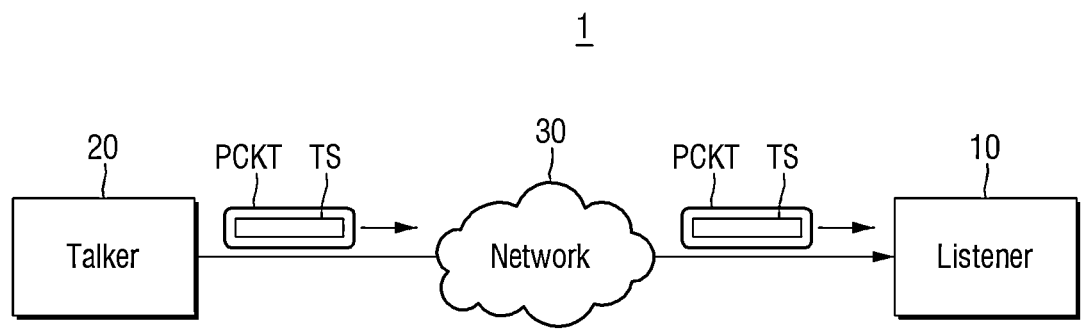
FIG. 1 is an example diagram for explaining a media system according to some example embodiments.

FIG. 1 is an example diagram for explaining a media system according to some example embodiments.

Referring to FIG. 1, a media system 1 may include a talker 20, a listener 10, and a network 30.

The talker 20 may transmit data to the listener 10 through the network 30. That is, the talker 20 may mean a transmitter, and may mean a source unit.

The talker 20 may transmit the media clock used inside in the form of a time stamp TS so that the listener 10 may use the same media clock. For example, the talker 20 may generate a time stamp TS at a rising edge of the media clock. The time stamp TS may be transmitted in the form included in the packet PCKT.

At this time, although the packet PCKT may be transmitted in the form that complies with a CRF (Clock reference format) packet, that is, an SRP (Stream reservation protocol), the example embodiments are not limited thereto.

The listener 10 may receive data from the talker 20 through the network 30. That is, the listener 10 may mean a receiver or a sink unit.

The listener 10 may recover the media clock required to output the data, using the time stamp TS included in the packet PCKT transmitted from the talker 20. For example, the listener 10 may toggle the clock on the basis of the time information of the provided time stamp TS to generate the media clock.

The network 30 may mean a transmission channel for the talker 20 to transmit data and packet PCKT to the listener 10. The network 30 may include an Ethernet, but the example embodiments are not limited thereto.

Figure 2:
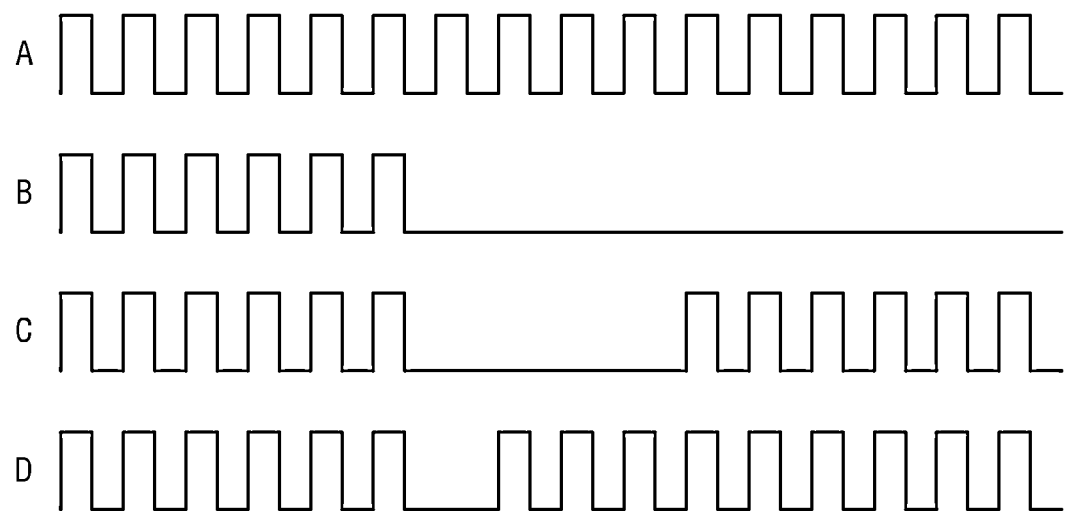
FIG. 2 is an example diagram for explaining a case where the media clock is not received by the listener in the media system according to some example embodiments.

FIG. 2 is an example diagram for explaining a case where the media clock is not received by the listener in the media system according to some example embodiments.

Referring to FIG. 2, when the packet PCKT is normally provided from the talker 20 of FIG. 1 to the listener 10, the listener 10 may generate a media clock having a toggling form for each of regular intervals as shown in A.

On the other hand, in some situations, the packet PCKT may be abnormally provided from the talker 20 to the listener 10. For example, as shown in B, the supply of the packet PCKT to the listener 10 may be interrupted due to a network connection problem. Since the listener 10 may not toggle the clock without supply of the time stamp TS after a specific time point in this case, the media clock may not be generated.

Further, as shown in C, for example, when the packet PCKT is delayed and transmitted from the talker 20, since the media clock generated on the listener 10 side is not toggled during the delay section, the media clock may not be generated during that section.

Further, as shown in D, for example, when a part of the packet PCKT transmitted to the listener 10 is damaged, the media clock generated on the listener 10 side may not be generated during a section corresponding to the damaged packet PCKT.

The media clock device according to some example embodiments of the present disclosure, or the electronic device such as the listener 10 including the media clock device may continuously generate the media clock to prevent the interruption of the media clock, even when the aforementioned network problem or a problem in the packet PCKT transmitted from the talker 20 occur, and the supply of the time stamp TS included in the packet PCKT is abnormal.

Figure 3:
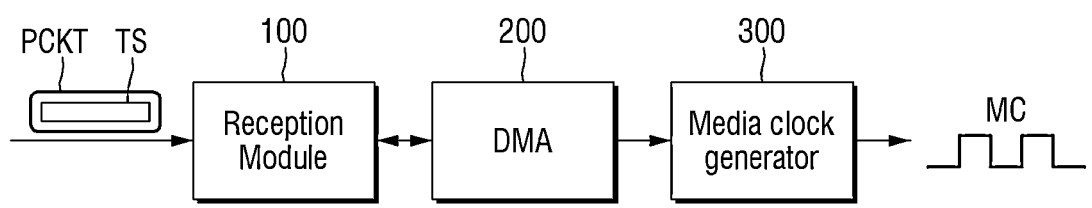
FIG. 3 is an example block diagram for explaining the configuration of the listener according to some example embodiments.

FIG. 3 is an example block diagram for explaining the configuration of the listener according to some example embodiments.

Referring to FIG. 3, the listener 10 may include a reception module 100, a DMA (Direct Memory Access) 200, and a media clock generator 300.

The reception module 100 may receive the packet PCKT from the outside through a network. That is, the reception module 100 may receive the time stamp TS included in the packet PCKT and received through the network.

As described in FIG. 2, the reception module 100 may determine whether the received packet PCKT is normal. When the time stamp TS included in the received packet PCKT is normal, the reception module 100 may extract the time stamp TS from the packet PCKT.

Alternatively, the reception module 100 may generate a dummy time stamp for generating the media clock MC when the time stamp TS included in the received packet PCKT is abnormal.

The reception module 100 may calculate an average time interval of the dummy time stamp in the process of generating the dummy time stamp. The specific contents thereof will be described later. The reception module 100 may provide the extracted time stamp or dummy time stamp to the DMA 200.

The DMA 200 may receive the time stamp extracted from the packet normally received from the reception module 100, or a dummy time stamp generated by the reception module 100 in an abnormal case. The DMA 200 may include a buffer that temporarily stores the received time stamp or dummy time stamp.

The DMA 200 may provide the extracted time stamp or dummy time stamp to the media clock generator 300. The DMA 200 may control the media clock generator 300 so that the media clock generator 300 may toggle for each of regular time intervals to generate a constant media clock MC. The DMA 200 may provide the media clock generator 300 with the extracted time stamp or the dummy time stamp for each of regular time intervals.

The media clock generator 300 may receive the extracted time stamp or the dummy time stamp from the DMA 200. The media clock generator 300 may generate the media clock MC on the basis of the extracted time stamp or dummy time stamp. The media clock generator 300 may include an oscillator, but the example embodiments are not limited thereto.

Figure 4:
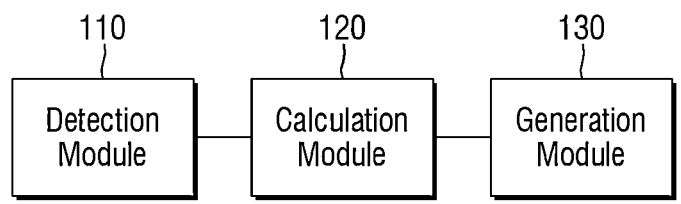
FIG. 4 is an example block diagram for explaining the configuration of the reception module according to some example embodiments.

FIG. 4 is an example block diagram for explaining the configuration of the reception module according to some example embodiments.

Referring to FIG. 4, the reception module 100 may include a detection module 110, a calculation module 120, and a generation module 130.

The detection module 110 may determine whether the time stamp included in the packet PCKT and received from the outside through a network is normal.

For example, as described in FIG. 2, the detection module 110 may determine that the time stamp received by being included in the packet PCKT is abnormal, when the supply of the packet PCKT is interrupted due to a connection problem of the network, or when the packet PCKT is supplied with a delay for a certain period of time, or when the packet PCKT is supplied with a certain partial damage. However, the above case is only explained as an example in which the time stamp TS is abnormal for convenience of explanation, and the example embodiments are not limited thereto. Specifically, the detection module 110 may also detect various other abnormal situations such as a case where the time stamp TS interval of continuously received packets PCKT is significantly different from an expected interval, a case where a serial number of the packet PCKT is discontinuous, or a case where a network interface link down is sensed.

The calculation module 120 may calculate the average time interval of the dummy time stamp in response to the determination result of the detection module 110 being abnormal. Although the calculation module 120 may specifically calculate the average time interval of the dummy time stamp, using a simple moving average (SMA) method to be described later, the example embodiments are not limited thereto.

The generation module 130 may generate a dummy time stamp on the basis of the average time interval of the dummy time stamps calculated from the calculation module 120.

The generation module 130 may provide the generated dummy time stamp to the DMA 200 of FIG. 3.

Figure 5:
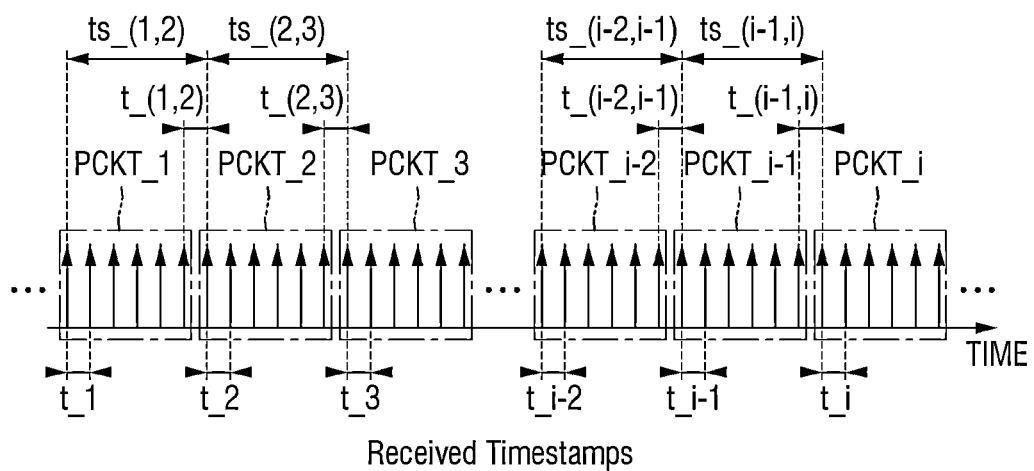
FIG. 5 is an example diagram for explaining the time stamp received by the listener according to some example embodiments.

FIG. 5 is an example diagram for explaining the time stamp received by the listener according to some example embodiments.

Referring to FIG. 5, the listener 10 may receive a plurality of packets (PCKT_1, PCKT_2, PCKT_3, ..., PCKT_i-2, PCKT_i-1, and PCKT_i) from the talker 20 through the network 30 according to the flow of time. In FIG. 5, it is assumed that a plurality of packets (PCKT_1, PCKT_2, PCKT_3, ..., PCKT_i-2, PCKT_i-1, and PCKT_i) are normally provided to the listener 10. It is also assumed that each of the plurality of packets (PCKT_1, PCKT_2, PCKT_3, ..., PCKT_i-2, PCKT_i-1, and PCKT_i) includes six time stamps.

When the plurality of packets (PCKT_1, PCKT_2, PCKT_3, ..., PCKT_i-2, PCKT_i-1, and PCKT_i) are normally provided, a time interval t_1 between the time stamps included in the first packet PCKT_1, a time interval t_2 between the time stamps included in the second packet PCKT_2, a time interval t_3 between the time stamps included in the third packet PCKT_3, a time interval t_i-2 between the time stamps included in a i-$2^{nd}$ packet PCKT_i-2, a time interval t_i-1 between the time stamps included in a i-$1^{st}$ packet PCKT_i-1, and a time interval t_i between the time stamps included in a $i^{th}$ packet PCKT_i may be equal to each other.

Also, when the plurality of packets (PCKT_1, PCKT_2, PCKT_3, ..., PCKT_i-2, PCKT_i-1, and PCKT_i) are normally provided, a time interval t_(1,2) between a last time stamp included in the first packet PCKT_1 and a first time stamp included in the second packet PCKT_2, a time interval t_(2,3) between the last time stamp included in the second packet PCKT_2 and the first time stamp included in the third packet PCKT_3, a time interval t_(i-2,i-1) between the last time stamp included in the i-$2^{nd}$ packet PCKT_i-2 and the first time stamp included in the i-$1^{st}$ packet PCKT_i-1, and a time interval t_(i-2,i-1) between the last time stamp included in the first i-$1^{st}$ packet PCKT_i-1 and the first time stamp included in the $i^{th}$ packet PCKT_i may be the equal to each other.

Furthermore, when the plurality of packets (PCKT_1, PCKT_2, PCKT_3, ..., PCKT_i-2, PCKT_i-1, and PCKT_i) are normally provided, a time interval ts_(1,2) between the first time stamp included in the first packet PCKT_1 and the first time stamp included in the second packet PCKT_2, a time interval ts_(2,3) between the first time stamp included in the second packet PCKT_2 and the first time included in the third packet PCKT_3, a time interval ts_(i-2,i-1) between the first time stamp included in the i-$2^{nd}$ packet PCKT_i-2 and the first time stamp included in the i-$1^{st}$ packet PCKT_i-1, and a time interval ts_(i-1,i) between the first time stamp included in the first i-$1^{st}$ packet PCKT_i-1 and the first time stamp included in the $i^{th}$ packet PCKT_i are equal to each other.

That is, when the packet is normally provided to the listener 10, the time stamp TS may the same time interval in each of the plurality of packets (PCKT_1, PCKT_2, PCKT_3, ..., PCKT_i-2, PCKT_i-1, and PCKT_i).

Figure 6:
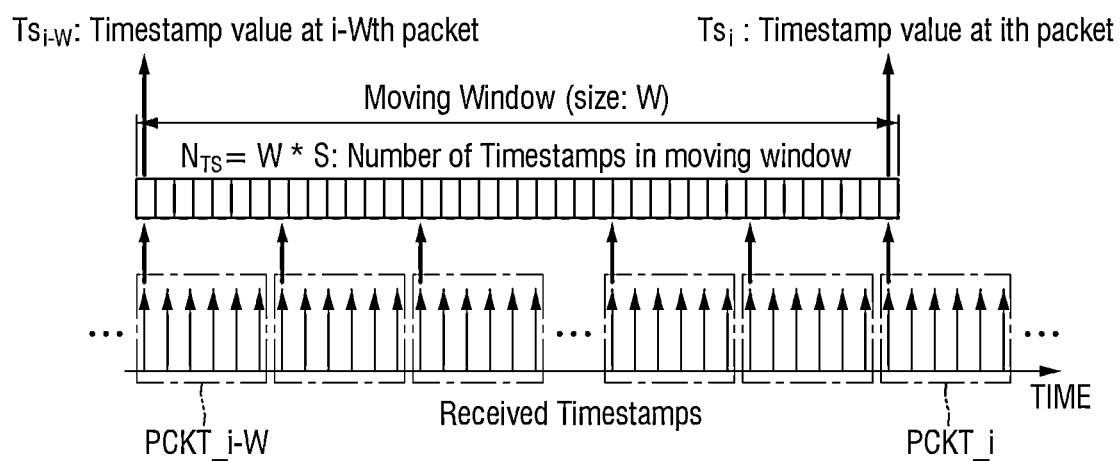
FIG. 6 is an example diagram for explaining a method by which the listener according to some example embodiments recovers the media clock.

FIG. 6 is an example diagram for explaining a method by which the listener according to some example embodiments recovers the media clock.

Referring to FIG. 6, the calculation module 120 of the listener 10 may calculate the average time interval of dummy time stamps, using a moving window. Here, the moving window may have a preset size, or alternatively, a desired size. Specifically, the moving window may be preset with respect to the number of included time stamps.

For example, the moving window may include W packets. Alternatively, the moving window may include W packets stored in the buffer inside DMA 200 of FIG. 3. Each of one packet or the packets stored in the buffer inside the DMA 200 may include S time stamps. That is, in FIGS. 5 and 6, the value of S may correspond to 6, but the example embodiments are not limited thereto. Therefore, the moving window may include a total of N×S time stamps.

At this time, the moving window may move together along the time axis, as the packet continues to be received over time. Specifically, the moving window may be moved rather than fixed at a constant time point.

For example, although FIG. 6 shows that the moving window includes an i-$W^{th}$ packet PCKT_i-W to an $i^{th}$ packet PCKT_i, it is assumed that the packet be continuously received normally even after the $i^{th}$ packet PCKT_i is received, and the packet received most recently be an i+$W^{th}$ packet. In this case, the moving window may include the $i^{th}$ packet PCKT_i to the i+$W^{th}$ packet PCKT_i+W, instead of including the i-$W^{th}$ packet PCKT_i-W to the $i^{th}$ packet PCKT_i.

Figure 7:
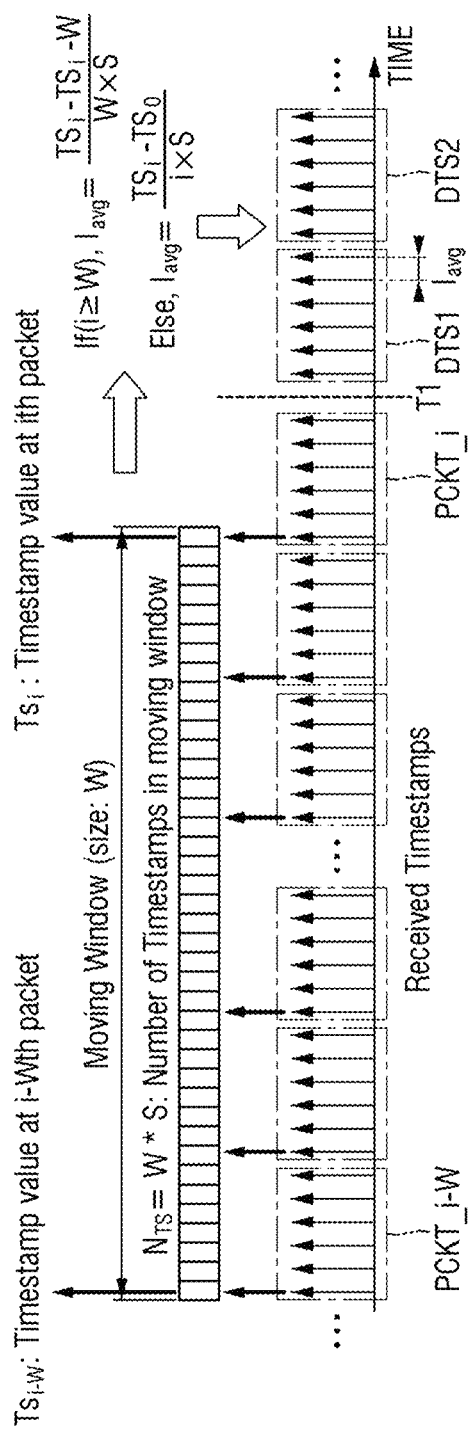
FIG. 7 is an example diagram for explaining a method by which a listener according to some example embodiments generates a dummy time stamp.

FIG. 7 is an example diagram for explaining a method by which a listener according to some example embodiments generates a dummy time stamp.

Referring to FIG. 7, when the time stamp is abnormal at the first time point TS1 as described in FIG. 2, the reception module 100 may generate the dummy time stamp DTS_1 and DTS_2. For example, referring to FIG. 5, when the time interval t_1 between the time stamps included in the first packet PCKT_1, or the time intervals (t_2, t_3, . . . , t_i–2, t_i–1, and ti) between the time stamps included in each of the other remaining packets (PCKT_2, PCKT_3, . . . , PCKT_i–2, PCKT_i–1, and PCKT_i) are not the same and are discontinuous, the detection module 110 may determine that the packet is abnormally received.

Further, for example, when the time interval ts_(1,2) between the first time stamp included in the first packet PCKT_1 and the first time stamp included in the second packet PCKT_2, and similarly, the time intervals of the first time stamps included in other packets are not the same, the detection module 110 may determine that the packet is received abnormally.

In this case, the reception module 100 may calculate an average time interval $I_{avg}$ of the dummy time stamp by the use of the time stamp included in the packet received from the talker 20 through the network 30 before the first time point T1 on which the received time stamp is determined to be abnormal.

Specifically, the reception module 100 may calculate the average time interval $I_{avg}$ of the dummy time stamp, using the most recently received normal $i^{th}$ packet PCKT_i before the first time point T1 on which the received time stamp is determined to be abnormal, and the i–W$^{th}$ packet PCKT_i–W that is determined depending on the size of the moving window set in advance and earlier by W than the $i^{th}$ packet PCKT_i. That is, the i–W$^{th}$ packet PCKT_i–W may mean a packet received at a specific time point that is set in advance before the first time point T1.

At this time, the average time interval $I_{avg}$ of the dummy time stamp may be calculated, using the following formula.

$$I_{avg} = \frac{TS_i - TS_{i-w}}{W \times S} \quad \text{[Formula 1]}$$

Here, $I_{avg}$ is the average time interval of the dummy time stamp, $TS_i$ is the time at which the most recently received $i^{th}$ packet PCKT_i is received before the first time point TS1, $TS_{i-w}$ is the time at which i–W$^{th}$ packet PCKT_i–W is received, W is the number of packets included in the moving window or the number of packets included in the time preset with respect to the moving window, and S may means the number of time stamps included in each of the received packets.

On the other hand, for example, there may be a case where the packet is abnormally received, then instantaneously normally received, and then abnormally received again from the first time point TS1. In this case, since the number of packets normally received instantaneously may be smaller than the number of packets included in the moving window, in such a situation, the average time interval $I_{avg}$ of the dummy time stamp may be calculated using the following formula.

$$I_{avg} = \frac{TS_i - TS_0}{i \times S} \quad \text{[Formula 2]}$$

Here, $I_{avg}$ is an average time interval of the dummy time stamp, $TS_i$ is the time at which the most recently received $i^{th}$ packet PCKT_i is received before the first time point TS1, $TS_0$ is the time at which the packet received first among the packets received normally is received, i is the number of packets included in the normally received interval, and S may mean the number of time stamps included in each received packet.

However, the method of calculating the average time interval $I_{avg}$ of the dummy time stamp is not limited to the above example embodiment, and as the method of calculating the average time interval $I_{avg}$, various methods that allow to have values that are substantially the same as the time interval of the time stamp included in the packet can, of course, be applied according to some example embodiments.

As described above, since the media clock recovery device according to some example embodiments of the present disclosure may be calculated on the basis of the average time interval of a normal time stamp received from the outside, it is possible to generate a similar media clock with almost no change in frequency, when compared with the media clock used in the talker 20.

Figure 8:
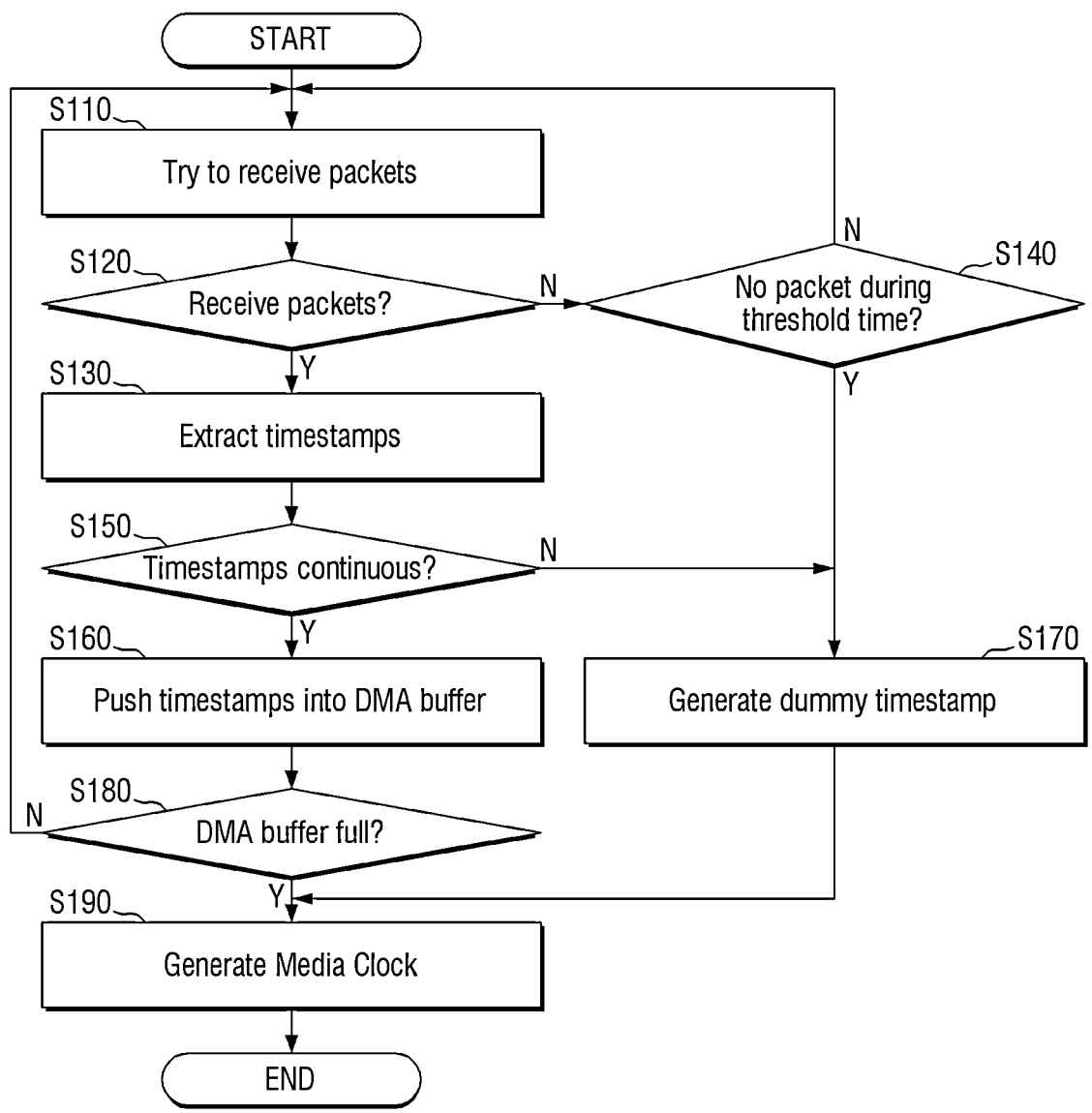
FIG. 8 is an example flowchart for explaining a method by which the listener according to some example embodiments recovers the media clock.

FIG. 8 is an example flowchart for explaining a method by which the listener according to some example embodiments recovers the media clock.

Referring to FIG. 8, the media clock recovery device attempts to receive the packet provided through the network (S110). Specifically, the reception module 100 attempts to receive the packet.

After that, it is possible to determine whether the packet is received from the outside (S120). Specifically, the reception module 100 may determine whether the packet is received from the outside.

After that, when the packet is received from the outside (Y of S120), the reception module 100 may extract the time stamp included in the packet (S130). Specifically, the detection module 110 included in the reception module 100 may extract the time stamp included in the packet received from the outside.

On the other hand, when the packet is not received from the outside (N of S120), the reception module 100 may determine whether the packet is received within a preset time threshold value (or alternatively, a desired time threshold value) or more from the reception time of the finally received packet. Specifically, the detection module 110 included in the reception module 100 may determine whether the packet is received within a preset time threshold value or more from the reception time of the finally received packet or a previously received packet. The previously received packet may be the directly previously received packet before the packet, such that no packets were received between the previously received packet and the packet. Although the preset time threshold value may be determined on the basis of the frequency of the media clock and the number of time stamps included in the packet, the example embodiments are not limited thereto.

When the packet is not received within a preset time threshold value or more (Y of S140), the reception module 100 may generate a dummy time stamp (S170). Specifically, the generation module 130 may generate the dummy time stamp on the basis of the average time interval of the dummy time stamps calculated from the calculation module 120. The method of calculating the average time interval of the dummy time stamp is the same as that described referring to FIGS. 5 to 7, and therefore will be omitted below.

On the other hand, when the packet is received within a preset time threshold value or more (N of S140), the reception module 100 attempts to receive the packet again (S110).

On the other hand, when the packet is received to extract the time stamp, the reception module 100 may determine whether the time interval of the extracted time stamp is continuous (S150). Specifically, the detection module 110 included in the reception module 100 may determine whether the time interval of the extracted time stamp is continuous.

When the time interval of the extracted time stamp is discontinuous (S150, N), the reception module 100 may generate the dummy time stamp. Specifically, when the time interval of the extracted time stamp is discontinuous, the generation module 130 may generate a dummy time stamp on the basis of the average time interval of the dummy time stamp calculated from the calculation module 120. The method of calculating the average time interval of the dummy time stamp is the same as that described in FIGS. 5 to 7, and therefore will be omitted below.

When the time interval of the extracted time stamp is continuous (S150, Y), the reception module 100 may provide the extracted time stamps to the DMA 200 (S160). Specifically, the reception module may provide the extracted time stamp to the buffer of the DMA 200 and temporarily store the time stamp therein.

Subsequently, it is possible to check whether the time stamp is stored maximally in the buffer included in the DMA 200 (S180). Specifically, the DMA buffer may check whether the number of time stamps stored inside exceeds a preset storage capacity.

Subsequently, when the time stamp is stored inside the buffer included in the DMA 200 above the maximum capacity (S180, Y), or alternatively, a threshold capacity, the DMA 200 may provide the time stamp to the media clock generator 300, and the media clock generator 300 may generate a media clock, using the time stamp (S190). Specifically, the DMA 200 may provide the stored time stamp to the media clock generator 300 according to the stored order, and the media clock generator 300 may generate a media clock on the basis of the time stamp.

On the other hand, when the time stamp is stored inside the buffer included in the DMA 200 below the maximum capacity (S180, N), the DMA 200 may provide the signal to the reception module 100 to control the reception module to attempt to receive the packet.

On the other hand, when the packet is not received within a preset time threshold value or more (Y of S140) or when the time interval of the extracted time stamp is discontinuous (S150, N), the reception module 100 may generate a dummy time stamp (S170). In this case, since the packet is being received abnormally, the DMA 200 may provide the generated dummy time stamp to the media clock generator 300 regardless of whether the time stamp is stored inside the buffer inside the DMA 200 at the maximum storage capacity or more, and the media clock generator 300 may generate a media clock on the basis of the provided dummy time stamp (S190).

Figure 9:
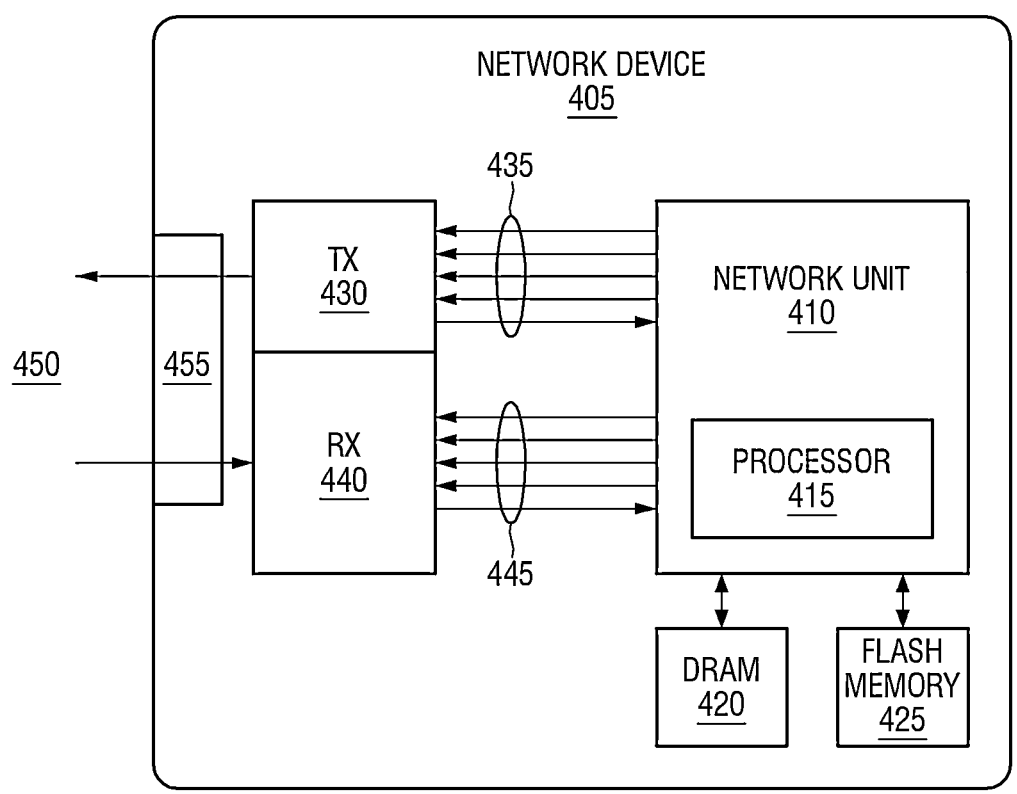
FIG. 9 is an example diagram for explaining a network device according to some example embodiments.

FIG. 9 is an example diagram for explaining a network device according to some example embodiments.

Referring to FIG. 9, a network device 405 may mean an apparatus to which the method for generating a media clock described through FIGS. 1 to 8 is applied. For example, the network device 405 may include a computing device, a network computing system, a television, a cable set top box, a radio, a Blu-ray player, a DVD player, a CD player, an amplifier, an audio/video receiver, a smart phone, a personal digital assistant (PDA), a storage unit, a game console, or other media devices. However, the example embodiments are not limited thereto.

The network device 405 may include a network unit 410 that performs network functions. The network functions may include, but are not limited to, generation, transmission, storage, and reception of media content streams. Although the network unit 410 may be implemented by a SoC (System on Chip) or the like, the example embodiments are not limited thereto.

The network unit 410 may include a processor 415 for processing the data. Although the processing of data may include a generating operation of a media data stream, a converting operation of the media data stream for transmission to storage, and decrypting/encrypting operation for use of the media data stream, the example embodiments are not limited thereto. The network device 405 may also include a DRAM 420 or similar volatile memory for supporting network calculation, and a flash memory 425 or similar non-volatile memory. The network device 405 may also include a static storage device that stores instructions and static information executed by the processor 415 such as a ROM.

A data storage device such as a disk or an optical disk and a disk driver corresponding thereto may be connected to the network device 405 to store information and instructions. The network device 405 may be connected to an input/output bus through an input/output interface. A plurality of input/output devices (e.g., a display device or the like) may be connected to the input/output bus. The network device 405 may be connected to a communication device for accessing another computer, server, or the like through an external data network. The communication device may include several types of networks such as a modem, a network interface card, or an Ethernet.

The network device 405 may include a transmitter 430 that transmits data through one or more network interfaces 455, and a receiver 440 that receives data. The transmitter 430 or the receiver 440 may be connected through an Ethernet cable or a cable 450 that includes a wireless unit. The transmitter 430 or the receiver 440 may transmit or receive data to or receive data from the network unit 410 through one or more lines 435 and 445. The network device 405 may further include various constituent elements (not shown) for media operation.

Figure 10:
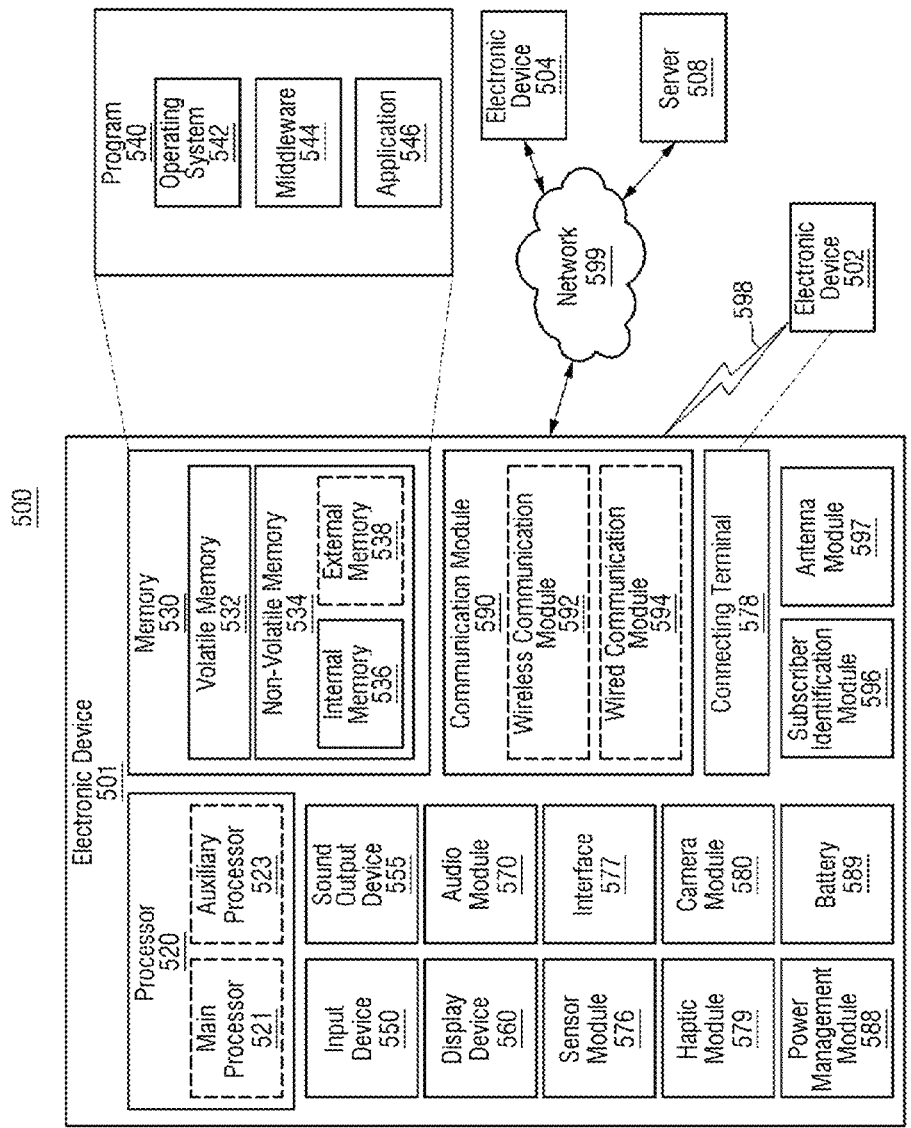
FIG. 10 is an example diagram for explaining an electronic device according to some example embodiments.

FIG. 10 is an example diagram for explaining an electronic device according to some example embodiments.

Referring to FIG. 10, an electronic device 501 may communicate with an electronic device 502 through a first network 598 (e.g., a short-range wireless communication network) or may communicate with an electronic device 504 or a server 508 through a second network 599 (e.g., a long-range wireless communication network). According to the example embodiment, the electronic device 501 may communicate with the electronic device 504 through the server 508.

According to the example embodiment, the electronic device 501 may include a processor 520, a memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596 or an antenna 597. In some example embodiments, at least one of the aforementioned constituent elements (e.g., a display device 560 or a camera 580) may be omitted from the electronic device 501, or one or more other constituent elements may be added to the electronic device 501. In some example embodiments, some of the constituent elements may be implemented as a single integrated circuit. For example, the sensor 576 (e.g., a fingerprint sensor, an iris sensor, or an illuminance sensor) may be implemented to be incorporated into the display device 560 (e.g., a display).

The processor 520 may execute, for example, software (e.g., program 540) to control at least one other constituent element (e.g., hardware or software constituent element) of the electronic device 501 coupled to the processor 520, and may perform various data processing or calculations. According to an example embodiment of the present disclosure, as at least part of the data processing or calculations, the processor 520 may load the command or data received from other constituent elements (e.g., the sensor 576 or the communication interface 590) into a volatile memory 532, process the command or data stored in the volatile memory 532, and store the resulting data in a non-volatile memory 534.

According to the example embodiment of the present disclosure, the processor 520 may include a main processor 521 (e.g., a central processing unit (CPU) or an application processor (AP)), and an auxiliary processor 523 (e.g., a graphic processing unit (GPU), an image signal processor (ISP), a sensor hub processor, or a communication processor (CP)) that may operate independently of the main processor 521 or together with the main processor 521. Additionally or alternatively, the auxiliary processor 523 may be adapted to consume less power than the main processor 521, or may be adapted to specialize in a specified function. The auxiliary processor 523 may be implemented separately from the main processor 521 or as a part of the main processor 521.

The auxiliary processor 523 may control at least some of the functions or states related to at least one constituent element (e.g., the display device 560, the sensor 576 or the communication interface 590) of the constituent elements of the electronic device 501, in place of the main processor 521 while the main processor 521 is in an inactive (e.g., sleep) state, or along with the main processor 521 while the main processor 521 is in the active state (e.g., during execution of application). According to the example embodiment, the auxiliary processor 523 (e.g., the image signal processor or the communication processor) may be implemented as a part of other constituent elements (e.g., the camera 580 or the communication interface 190) that are functionally related to the auxiliary processor 523.

The memory 530 may store various data used by at least one constituent element (e.g., the processor 520 or the sensor 576) of the electronic device 501. The various data may include, for example, input data or output data for software (e.g., the program 540) and commands related thereto. The memory 530 may include a volatile memory 532 or a non-volatile memory 534.

The program 50 may be stored as software in the memory 530, and may include, for example, an operating system (OS) 542, a middleware 544 or an application 546.

The input device 550 may receive a command or data to be used by another constituent element (e.g., the processor 520) of the electronic device 501, from outside of the electronic device 501 (e.g., a user). The input device 550 may include, for example, a microphone, a mouse, a keyboard or a digital pen (e.g., a stylus pen).

The sound output device 555 may output sound signals to the outside of the electronic device 501. The sound output device 555 may include, for example, a speaker or a receiver. The speaker may be used for general purposes such as a multimedia playback or a record playback, and the receiver may be used for incoming calls. According to the example embodiment, the receiver may be implemented separately from the speaker or as a part of the speaker.

The display device 560 may visually provide information to the outside (for example, a user) of the electronic device 501. The display device 560 may include, for example, a display, a hologram device or a projector, and a control circuit for controlling the corresponding one of the displays, the hologram device, and the projector. According to the example embodiment, the display device 560 may include a touch circuit adapted to detect a touch, or a sensor circuit (e.g., a pressure sensor) adapted to measure the strength of a force generated by the touch.

The audio 570 may convert sound into an electrical signal and vice versa. According to the example embodiment, the audio 570 may acquire the sound through the input device 550, or may output the sound through the sound output device 555 or through a headphone of an external electronic device (e.g., the electronic device 502) directly (e.g., using a wired line) or wirelessly coupled with the electronic device 501.

After detecting an operational state (for example, power or temperature) of the electronic device 501 or an external environmental state (for example, a user's state) of the electronic device 501, the sensor 576 may generate an electric signal or a data value corresponding to the detected state. According to the example embodiment, the sensor 576 may include, for example, a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The interface 577 may support one or more specific protocols which are used by the electronic device 501 to be coupled directly (e.g., using a wired line) or wirelessly to an external electronic device (e.g., the electronic device 502). According to the example embodiment of the present disclosure, the interface 577 may include, for example, a high definition multimedia interface (HDM), a universal serial bus (USB) interface, a secure digital (SD) card interface or an audio interface.

A connecting terminal 578 may include a connector through which the electronic device 501 may be physically connected to the external electronic device (e.g., the electronic device 502). According to the example embodiment, the connecting terminal 578 may include, for example, an HDMI connector, a USB connector, an SD card connector or an audio connector (e.g., a headphone connector).

The haptic 579 may convert an electrical signal into a mechanical stimulus (e.g., vibration or motion) or an electrical stimulus that may be perceived by the user through a user's haptic or a kinesthetic sensation. According to the example embodiment, the haptic 579 may include, for example, a motor, a piezoelectric element or an electrical stimulator.

The camera 580 may capture still images or moving images. According to the example embodiment of the present disclosure, the camera 580 may include one or more lenses, image sensors, image signal processors or flashes.

The power management 588 may manage the power supplied to the electronic device 501. According to some example embodiments, the power management 588 may be implemented, for example, as at least a part of a power management integrated circuit (PMIC). The battery 589 may supply the power to at least one constituent element of the electronic device 501. According to some example embodiments, the battery 589 may include, for example, a non-rechargeable primary battery, a rechargeable secondary battery or a fuel cell.

The communication interface 590 may support the setting of a direct (e.g., a wired line) communication channel or a wireless communication channel between the electronic device 501 and the external electronic device (e.g., the electronic device 502, the electronic device 504 or the server 508), and the execution of communication through the set communication channel. The communication interface 590 may include one or more communication processors that may operate independently of the processor 520 (e.g., an application processor (AP)), and support direct (e.g., a wired line) or wireless communication.

The antenna 597 may transmit or receive signals or power to and from the outside of the electronic device 501 (e.g., an external electronic device). According to some example embodiment, the antenna 597 may include an antenna that includes a radiating element made up of a conductive material or a conductive pattern formed inside or above a substrate (e.g., a PCB). According to some example embodiments, the antenna 597 may include a plurality of antennas. In such a case, among the plurality of antennas, at least one antenna suitable for a communication scheme used in the communication network such as a first network 198 or a second network 599 may be selected, for example, by the communication interface 590 (e.g., the wireless communication interface 592). Next, the signal or power may be transmitted or received between the communication interface 590 and the external electronic device through at least one selected antenna. According to some example embodiments, other constituent elements other than the radiating element (for example, a radio frequency integrated circuit (RFIC)) may be additionally formed as a part of the antenna 597.

At least some of the aforementioned constituent elements are coupled together to perform communication of signals (e.g., commands or data) between them through an inter-peripheral communication scheme (e.g., a bus, a general-purpose input and output: GPIO), a serial peripheral interface (SPI), or a mobile industry processor interface: MIPI).

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

Example Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the example embodiments set forth herein are illustrative in all respects and not limiting.

What is claimed is:

1. A media clock recovery device comprising:
processing circuitry configured to
receive time stamps in a plurality of packets through a network;
determine whether a time stamp is normal;
calculate an average time interval based on the received time stamps, the calculated average time interval being used for generating a dummy time stamp in response to determining the time stamp is not normal;
generate a media clock based on the dummy time stamp in response to a determination that the time stamp is not normal; and
generate the media clock based on the time stamp in response to a determination that the time stamp is normal,
wherein the processing circuitry is configured to determine the time stamp is not normal, in response to at least one packet of the plurality of packets not being received within a time threshold value from a reception time of a previously received packet.

2. The media clock recovery device of claim 1, wherein the processing circuitry is further configured to
extract the time stamp from the at least one packet, and
determine the time stamp is not normal, in response to the at least one packet not being received within the time threshold value from the reception time of the previously received packet, or
in response to a time interval of the extracted time stamp being discontinuous.

3. The media clock recovery device of claim 1, wherein the processing circuitry calculates the average time interval of the dummy time stamp using the time stamp extracted from the at least one packet received prior to a first time point determined to be not normal.

4. The media clock recovery device of claim 3, wherein the average time interval of the dummy time stamp is determined based on
a time interval between the first time point and a second time point, and
a number of time stamps included in the received packet,
wherein the second time point is different and earlier in time than the first time point,
wherein the first time point is a reception time point of most recently received packet for which the determination result is normal, and
the time interval between the first time point and the second time point has a constant value.

5. The media clock recovery device of claim 4, wherein the average time interval of the dummy time stamp is calculated using the following formula:

$$I_{avg} = \frac{TS_i - TS_{i-w}}{W \times S}$$

where $I_{avg}$ the average time interval of the dummy time stamp, $TS_i$ is the time of the first time point, $TS_{i-w}$ is the time of the second time point, W is the number of packets included in the time threshold value, and S is the number of time stamps included in the received packets.

6. The media clock recovery device of claim 2, further comprising:
a direct memory access (DMA) including a DMA buffer, wherein the processing circuitry temporarily stores the extracted time stamp in the DMA buffer, when a time interval of the time stamp extracted from the received packet is continuous.

7. The media clock recovery device of claim 6, further comprising:
a media clock generator configured to generate the media clock, wherein
in response to a number of time stamps stored inside the DMA buffer exceeding a storage capacity of the DMA buffer, the DMA buffer is configured to provide the time stamps to the media clock generator according to an order of the time stamps,
in response to the determination result being normal, the media clock generator is configured to generate the media clock based on the extracted time stamps, and
in response to the determination result of being not normal, the media clock generator is configured to generate the media clock based on the dummy time stamp.

8. The media clock recovery device of claim 1, wherein the network includes an ethernet.

9. A method for recovering a media clock, the method comprising:
receiving time stamps in a plurality of packets through a network;
determining whether a time stamp received is normal;
calculating an average time interval based on the received time stamps, the calculated average time interval being used for generating a dummy time stamp in response to determining the time stamp is not normal;
generating a media clock based on the dummy time stamp in response to in response to a determination that the time stamp is not normal; and
generating the media clock based on the time stamp in response to a determination that the time stamp is normal,
wherein the determining whether the time stamp is normal is based on whether at least one packet of the plurality of packets is received within a time threshold value from a reception time of a previously received packet of the plurality of packets.

10. The method for recovering the media clock of claim 9, further comprising:
extracting the time stamp from the at least one packet, in response to the at least one packet being normally received; and
determining the time stamp is not normal, in response to at least one packet of the plurality of packets not being received within a time threshold value from a reception time of a previously received packet of the plurality of packets, or
in response to a time interval of the extracted time stamp of the at least one packet being discontinuous.

11. The method for recovering the media clock of claim 9, wherein calculating the average time interval of the dummy time stamp includes using the time stamp extracted from the at least one packet received prior to a first time point at which the time stamp is determined to be not normal.

12. The method for recovering the media clock of claim 11, wherein
the average time interval of the dummy time stamp is determined based on
a time interval between the first time point and a second time point, and
a number of time stamps included in the received packet,
wherein the second time point is different and earlier in time than the first time point,
the first time point is a reception time point of most recently received packet for which the determination result is normal, and
the time interval between the first time point and the second time point has a constant value.

13. The method for recovering the media clock of claim 12, wherein the average time interval of the dummy time stamp is calculated using the following formula:

$$I_{avg} = \frac{TS_i - TS_{i-w}}{W \times S}$$

where $I_{avg}$ the average time interval of the dummy time stamp, $TS_i$ is the time of the first time point, $TS_{i-w}$ is the time of the second time point, W is the number of packets included in the time threshold value, and S is the number of time stamps included in each of the received packets.

14. The method for recovering the media clock of claim 10, further comprising:
providing a direct memory access (DMA) including a DMA buffer; and
temporarily storing the extracted time stamp in the DMA buffer, when a time interval of the time stamp extracted from the at least one packet is continuous.

15. The method for recovering the media clock of claim 14, further comprising:
providing a media clock generator configured to generate the media clock; and
providing the time stamp to the media clock generator according to an order of the time stamps, in response to a number of time stamps stored inside the DMA buffer exceeding a preset storage capacity of the DMA buffer,
wherein the media clock generator generates the media clock based on the extracted time stamps, in response to the determination result being normal, and
wherein the media clock generator generates the media clock based on the dummy time stamp, in response to the determination result being not normal.

16. The method for recovering the media clock of claim 9, wherein the network includes an ethernet.

17. An electronic device comprising:
a receiver configured to receive a plurality of packets including time stamps and data from outside through a network, and generate a media clock using the time stamps;
a processing unit configured to receive the media clock to process the data; and
a transmitter configured to transmit the processed data to outside the electronic device,
wherein the receiver is configured to determine whether a time stamp is normal, based on whether at least one packet of the plurality of packets is received within a time threshold value from a reception time of a previously received packet of the plurality packets, wherein the receiver is configured to generate the media clock based on the time stamp in response to a determination that the time stamp is normal, wherein the receiver is configured to calculate an average time interval of a dummy time stamp in response to determining the time stamp is not normal, and wherein the receiver is configured to generate the media clock based on the dummy time stamp in response to a determination that the time stamp is not normal.

18. The electronic device of claim 17, wherein the receiver is configured to extract the time stamp from the at least one packet, and wherein the receiver is configured to determine the time stamp is not normal in response to a time interval of the extracted time stamp being discontinuous.

19. The electronic device of claim 17, wherein the receiver is configured to calculate the average time interval of the dummy time stamp using the time stamps.

20. The electronic device of claim 17, wherein the network includes an ethernet.

* * * * *